United States Patent [19]

Stevenson

[11] 4,428,896

[45] Jan. 31, 1984

[54] METHOD OF PRODUCING AN EXTRUDATE OF CONTROLLED SIZE AND SHAPE FROM A ROLLER DIE

[75] Inventor: James F. Stevenson, Hudson, Ohio

[73] Assignee: The General Tire & Rubber Company, Akron, Ohio

[21] Appl. No.: 412,633

[22] Filed: Aug. 30, 1982

[51] Int. Cl.³ .............................................. B29F 3/02
[52] U.S. Cl. .................................. 264/40.1; 264/40.4; 264/40.7; 425/140; 425/141; 425/149; 425/162
[58] Field of Search .................... 264/40.7, 40.1, 40.4; 425/140–141, 149, 162–163, 135

[56] References Cited

U.S. PATENT DOCUMENTS

| | | | |
|---|---|---|---|
| 3,871,810 | 3/1975 | Geyer | 425/374 |
| 3,890,078 | 6/1975 | Straumanis | 264/40.7 |
| 3,930,774 | 1/1976 | Brand et al. | 264/40.7 |
| 3,975,126 | 8/1976 | Wireman et al. | 425/141 |
| 4,087,499 | 5/1978 | Bayonnet | 264/40.7 |
| 4,088,721 | 5/1978 | Apicella | 264/40.4 |
| 4,095,156 | 6/1978 | Borisov et al. | 425/135 |
| 4,097,566 | 6/1978 | Bertin et al. | 264/40.7 |
| 4,156,913 | 5/1979 | Apicella | 264/40.7 |
| 4,233,255 | 11/1980 | Moon | 264/40.4 |
| 4,299,789 | 11/1981 | Giesbrecht | 425/224 |

FOREIGN PATENT DOCUMENTS

| | | | |
|---|---|---|---|
| 2304952 | 11/1976 | France | 425/141 |
| 50-36868 | 11/1975 | Japan | 264/40.4 |
| 2742984 | 3/1978 | Fed. Rep. of Germany | 264/40.4 |

Primary Examiner—Jeffery R. Thurlow

[57] ABSTRACT

A method of producing an extrudate using a roller die is disclosed in which on-line adjustments are made to size and shape deviations by changing the rotational speed of the extruder screw, the feed rate to the extruder, or the speed of the take-away device and the rotational speed of the roller die. The size and shape dimensions of the extrudate are measured and used to calculate new values for the screw or take-away speed of the feed rate and the roller die speed. A measurement of the extrudate dimensions may also be obtained at the roller die to provide a faster response.

6 Claims, 2 Drawing Figures

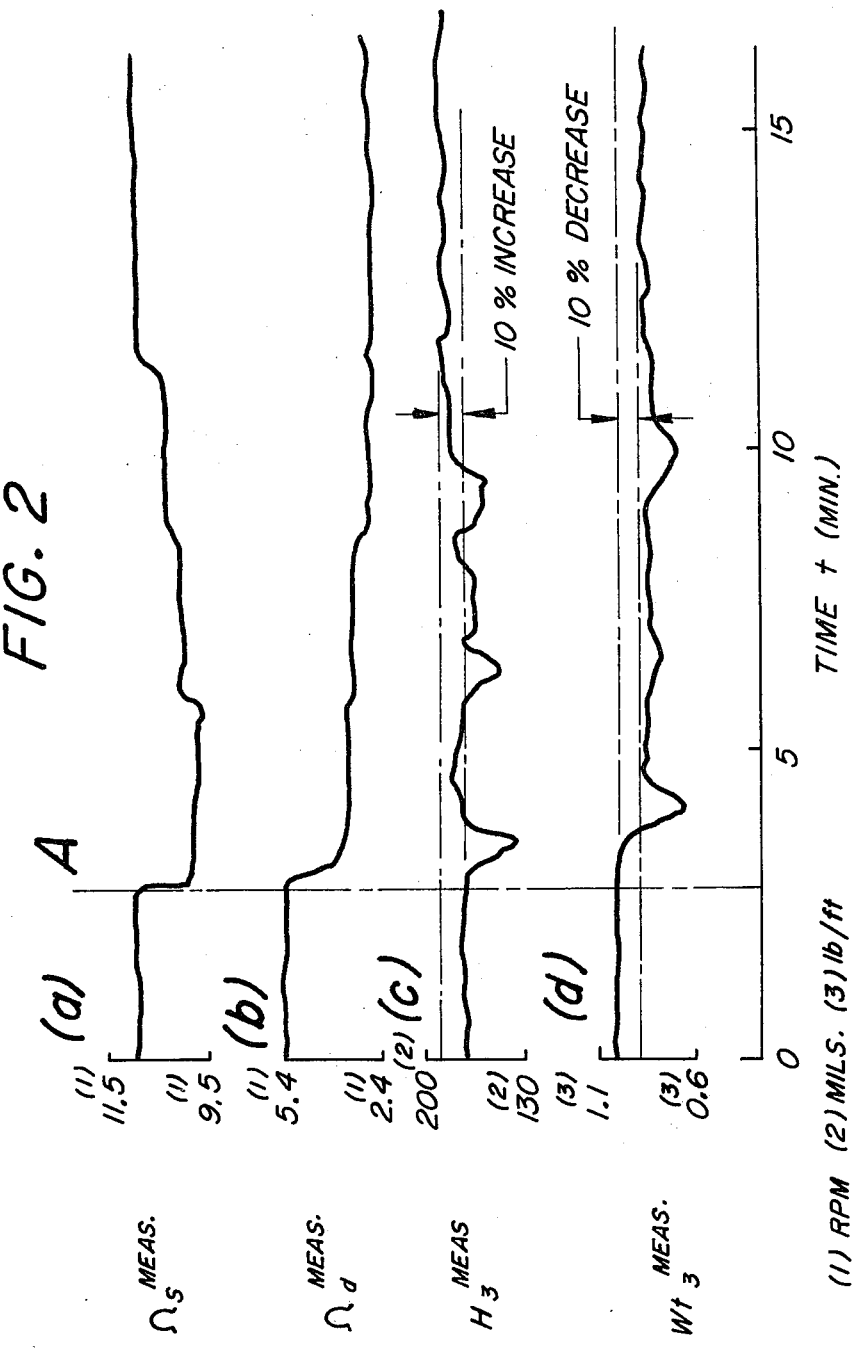

METHOD OF PRODUCING AN EXTRUDATE OF CONTROLLED SIZE AND SHAPE FROM A ROLLER DIE

BACKGROUND OF THE INVENTION

1. Field of the Invention

This invention relates to a method of operating an extrusion line having a single roller die, and more specifically to a method in which the size and shape of the extrudate are controlled by varying extruder operating speeds.

2. Description of the Prior Art

An extrusion line with a roller die comprises an extruder which heats, breaks down, mixes, and transports material to a reservoir. A roller die includes a roller which conveys the material from the reservoir by rotational motion past a plate die which shapes the material to produce an extrudate. An example of such an extruder and roller die combination may be found in U.S. Pat. No. 3,871,810, issued to Geyer. The extrudate is then transported from the roller by a take-away device or other conveyor system, while allowing it to stretch or contract and ultimately solidify by cooling or cross-linking.

In a cold-feed extrusion line, the output rate of the extruder is determined primarily by the speed of the screw which rotates inside the extruder. The screw speed governs the rate at which the material in the extruder can be advanced to the roller die. In a hot-feed extrusion line, the output rate of the extruder is determined primarily by the feed rate of hot stock which is supplied from a feed mill located some distance from the extruder.

While the extrusion line is designed to produce an extrudate having specified dimensions, deviations from the specified dimensions are continually being introduced by changes in material properties or by variations in the extrusion line operation. The dimensional variability can be divided into two categories: first, size deviations in which the cross-sectional area changes, but in which the ratios of the width and thickness dimensions (i.e., the shape) are constant; and, second, shape deviations in which the ratios of the width and thickness dimensions change, but in which the cross-sectional area (i.e., the size) is constant. In size changes, all dimensions change by the same percentage. In shape change, the dimensions change by different percentages from specification, although the overall cross-sectional area remains the same.

The control of size deviation by manipulating the output rate of the extruder or by manipulating the speed of the take-away device has been well known in the art. In cold-feed extruders, it is known to manipulate the speed of the screw to vary the extruder output and thus control size deviations. Likewise, in hot-feed extruders, it is known to manipulate the feed rate by varying the width of the strips of rubber fed into the extruder from the breakdown mill. Examples of processes in which the take-away speed is manipulated to control size deviations are also found in U.S. Pat. No. 4,087,499, issued to Bayonnet; No. 4,088,721 to Apicella; No. 4,097,566 to Bertin et al.; and No. 4,233,255 to Moon. Another example of a process control in which a double roller die is used to control size is shown in U.S. Pat. No. 3,975,126, issued to Wireman et al.

Shape deviations, however, have been more difficult to control by known means. One way of altering the shape has been to alter the geometry of the die by removing or adding metal along the die opening. This method is difficult to use during a production run because it requires production to be shut down during die modification and testing, and it causes a physical deterioration of the die.

Another approach for controlling shape deviations has been to use a die which could be adjusted by heated bolts or movable die sections. This method has often been used for flat or annular dies. For typical production profile dies, however, this method required a very complicated mechanical device. For tire tread extrusion, the adjustable sections of the die would also cause discontinuities along the tread profile.

Another more recent approach to controlling shape deviations is disclosed in U.S. patent application Ser. No. 06/412,634, filed simultaneously with this application, by Lee, Stevenson, and Griffith. This method proposes the manipulation of extruder operating temperatures in order to control shape deviations, with either the extruder stock temperature or the extruder die temperature, or both, being varied.

SUMMARY OF THE INVENTION

The present invention provides a method for producing an extrudate with a roller die which overcomes the problems of the prior art and provides a method for correcting both size and shape deviations in the extrudate during the operation of a production run. The method of the present invention allows the extrusion production process to be operated so that the size and shape of the extrudate can be automatically controlled within smaller tolerances than has been heretofore possible. As a result, deviations from specified extrudate dimensions which occur due to changes in material properties or extrusion line operation are corrected quickly, and the size and shape are maintained within tighter tolerances, resulting in lower processing costs and a reduction in the amount of scrap and reprocessed material which would otherwise occur. This, in turn, increases productivity because a single extruder can have a higher yield.

In addition, the method of the present invention can result in a significant savings of labor because the size and shape corrections are performed automatically, without the need for manual adjustment of the extruder or of the dies and with a minimum amount of intervention by the operator.

The present invention also produces a higher quality product because the dimensions of the extrudate can be maintained within closer tolerances, resulting in more precision parts and greater value in extrusion operations.

These and other advantages are achieved by the present invention of a method of producing an extrudate from an extruder having an output rate, a roller die having a plate die and a rotating roller and a take-away device. The method comprises the steps of operating the extruder at an initial output rate, rotating the roller at an initial speed, and operating the take-away device at an initial speed to produce an extrudate having initial dimensions; measuring the dimensions of the extrudate; comparing the measured dimension values with the desired dimension values; and varying the extruder output rate relative to the speed of the take-away device and varying the speed of the roller to change the initial dimensions to the desired dimensions.

Preferably, in cold-feed operations, the extruder output rate is varied by varying the speed of the screw in the extruder. In a hot-feed extrusion line, the average output rate is determined by the average feed rate of hot stock which is supplied from a feed mill located some distance from the extruder.

In accordance with one aspect of the invention, the actual speed of the roller die and the actual speed of the screw are measured, and ratios of the desired dimension values to the measured dimension values are used to compute new speeds for the extruder screw and the roller die.

The dimensions of the extrudate which are measured are preferably those which are directly related to size and shape. In the illustrated embodiment of the invention, the shape dimension is determined by measuring the thickness of the extrudate, while the size dimension is determined by measuring the linear weight of the extrudate.

BRIEF DESCRIPTION OF THE DRAWINGS

FIG. 2 is a series of graphs showing various parameters during a sample extrusion process in which the method of the present invention was used to produce a 10% increase in the thickness of the extrudate and a 10% decrease in the overall size of the extrudate.

DETAILED DESCRIPTION OF THE PREFERRED EMBODIMENT

Figure 1:
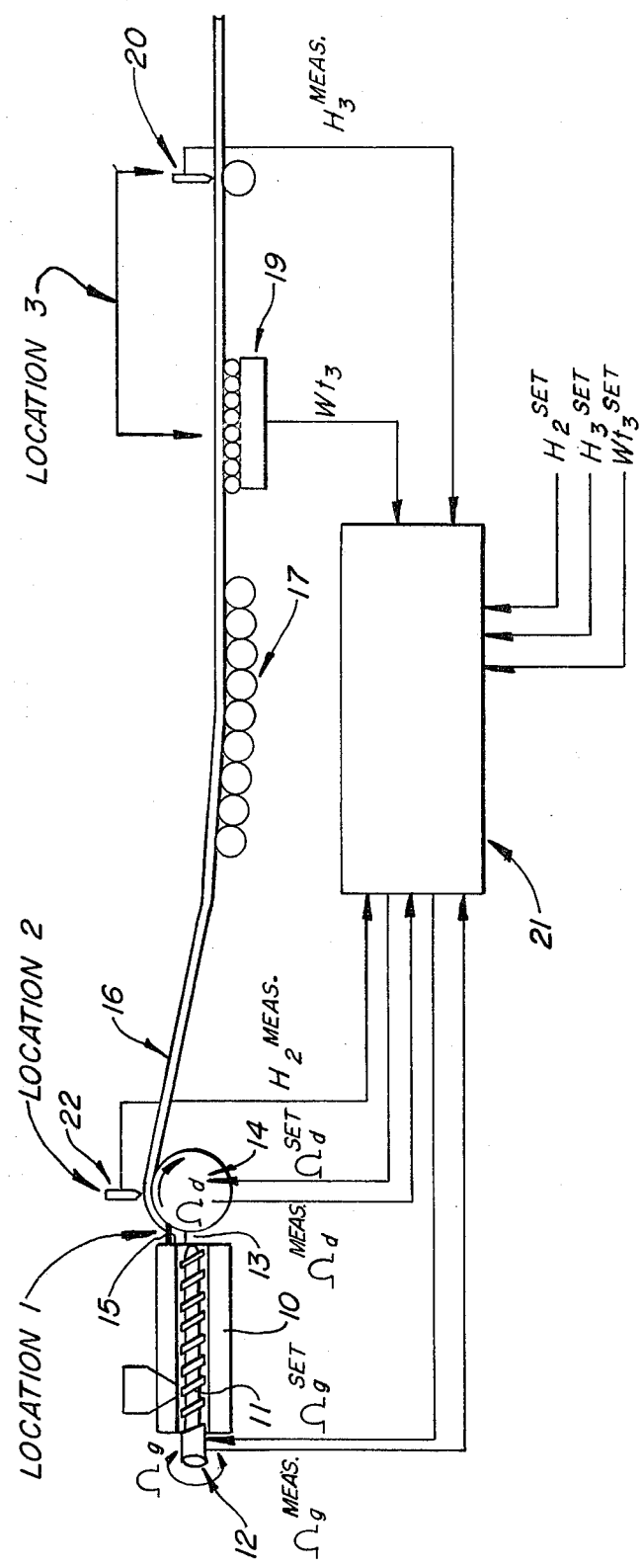
FIG. 1 is a schematic of the extrusion apparatus used to practice the process of the present invention.

Referring more particularly to the drawings, and initially to FIG. 1, there is shown a typical extrusion apparatus which has been adapted for use in the process of the present invention. The apparatus includes an extruder 10 having an internal screw 11 which turns by means of a screw speed control 12. The screw speed control 12 preferably includes means for reporting the rotational speed of the screw. The extruder 10 heats, breaks down, mixes, and transports material to a reservoir 13. Adjacent to the reservoir 13 is a roller die 14 which conveys materal by rotational motion of the roller surface from the reservoir 13 through a plate die 15 which shapes the material, producing a continuous extrudate 16. The roller die 14 also has means for controlling the speed of the roller and means for measuring the rotational speed of the roller. The extrudate 16 is then transported by a conveyor system comprising a take-away device 17 on which it attains a fixed shape by either cooling or cross-linking. The take-away device 17 may also include means for controlling the speed at which the extrudate is conveyed and for measuring this speed. Thereafter, the extrudate 16 passes through measuring devices 19 and 20. As shown in FIG. 1, the measuring device 19 comprises a weigh scale which measures the linear weight (weight per unit length) of the extrudate 16, and the measuring device 20 comprises a sensor for measuring the thickness of the extrudate. The outputs of the measuring devices 19 and 20 are fed to a process control unit 21. The process control unit 21 also receives the measured screw rotational speed from the screw control 12 and the measured rotational speed of the roller die 14. The process control unit may also receive the measured speed of the take-away device 17.

In order to provide faster control of the extrudate size and shape dimensions, an additional measuring device 22 may also be provided on the roller die 14. As shown in FIG. 1, the measuring device 22 measures the thickness of the extrudate on the roller die. The output of the measuring device 22 may also be fed to the process control unit 21.

The measuring devices 20 and 22, which comprise sensors for measuring the thickness of the extrudate, may be any suitable device which will provide an accurate thickness measurement. One such suitable device is a pneumatic, non-contacting, linear variable differential transformer (LVDT), such as Model No. PTD-125, manufactured by Schaevitz Company, of Pennsauken, N.J. With this sensor, measurement is accomplished by a moving member which is positioned by a pneumatic servomechanism a few thousandths of an inch away from, but not touching, the upper surface of the extrudate. The LVDT is coupled to the movable member of the follower to provide stepless, linear, electrical output proportional to the position of the thickness of the moving extrudate. This device is able to measure the thickness to within 1 mil. Other sensors known in the art may also be used.

While the preferred embodiment of the invention comprehends the measurement of linear weight and thickness of the extrudate 16, it is, of course, possible to measure the size and shape of the extrudate in other ways. For example, the width of the extrudate could be measured using a laser device or other suitable sensors, and width and thickness measurements could be used to determine the overall size of the extrudate. In general, two dimensions, one related to size and the other related to shape, can be used for process control.

FIG. 1 identifies three locations in the extrusion line. Location 1 is at the plate die. Location 2 is on the roller die 14. In the illustrated embodiment of the invention, a thickness measurement $H_2^{meas}$ is obtained at location 2 by the measuring device 22. Location 3 is on the conveyor after the extrudate has substantially solidified. A measurement of the extrudate linear weight $Wt_3^{meas}$ is obtained at location 3 by the measuring device 19, and a measurement of the extrudate thickness $H_3^{meas}$ is obtained at the location 3 by the measuring device 20.

The process control unit 21 may be any suitable microprocessor or microcomputer capable of performing the calculations described below and producing appropriate control signals to control the operation of the extrusion line. As previously described, the process control unit 21 receives the location 3 measured linear weight $Wt_3^{meas}$ from the measuring device 19 and the location 3 measured thickness $H_3^{meas}$ from the measuring device 20. In addition, the process control unit 21 may receive the location 2 measured thickness $H_2^{meas}$ from the measuring device 22. In order to determine the relationship of these measured values to predetermined desired or "set" values, an initial set value for each parameter, $H_2^{set}$, $H_3^{set}$, and $Wt_3^{set}$, is input to the process control unit 21. The process control unit 21 also receives from the screw speed control 12 the measured rotational speed of the extruder screw 11, $\Omega_s^{meas}$, and it receives from the roller die 14 the measured rotational speed of the roller die, $\Omega_d^{meas}$. The process control unit 21 is then capable of controlling the speeds of the screw and the roller die by sending to the screw speed control updated values for the screw speed set point, $\Omega_s^{set}$, and by sending to the roller die updated values of the die speed set point, $\Omega_d^{set}$.

The general control concept is to control size by increasing or decreasing linear weight by means of an increase or decrease in the extruder output (as represented by screw speed) or take-away speed, and to control shape by increasing or decreasing extrudate thickness (while extrudate width is held substantially constant) by decreasing or increasing roller die speed. The changes in screw or take-away speed and roller die speed can be made sequentially, but this results in very slow control because the result of each change must be observed before the next change is initiated. Therefore, it is preferred that changes in screw or take-away speed and roller die speed be made simultaneously using a defined relationship between the variables to predict the interaction between changes. One simple theoretical relationship for screw and roller die speeds is defined by the following equations for measurements made at location 3:

$$\Omega_d^{set} = \overline{\Omega}_d^{meas} \left( \frac{Wt_3^{set}}{\overline{Wt}_3^{meas}} \times \frac{\overline{H}_3^{meas}}{H_3^{set}} \right)^2, \quad (1)$$

and $$\Omega_s^{set} = \overline{\Omega}_s^{meas} \left( \frac{Wt_3^{set}}{\overline{Wt}_3^{meas}} \right). \quad (2)$$

The theoretical model represented by these equations is based on the assumptions that drawdown is uniform, that extrudate thickness on the roller die is directly proportional to screw speed and die opening thickness and is inversely proportional to roller die speed, and that extrudate width on the roller die is constant. Analogous equations can be derived if take-away speed is varied instead of screw speed.

It has been found that the screw speed and the roller die speed correspond approximately to the relationship given by equations (1) and (2). While more complex relationships may be used, it has been found that this simplified model is effective in achieving independent control of size and shape.

Equations (1) and (2) are then used to calculate updated set point values for roller die speed, $\Omega_d^{set}$, and screw speed, $\Omega_s^{set}$, so that the time-averaged measured values of roller die speed, $\overline{\Omega}_d^{meas}$, and screw speed, $\overline{\Omega}_s^{meas}$, can be changed to bring the measured linear weight, $\overline{Wt}_3^{meas}$, and the measured thickness, $\overline{H}_3^{meas}$, into closer agreement with the desired or set point values, $Wt_3^{set}$ and $H_3^{set}$.

A process control loop is thus provided. The extruder 10 and the roller die 14 produce an extrudate 16 at an initial extruder screw speed and an initial roller die speed. When the extrudate 16 reaches location 3, the thickness and the linear weight of the extrudate are measured and used to compute a new screw speed and a new roller die speed. These new speed set points are then fed back to the screw speed control 12 and the speed control for the roller die 14. This loop has a "delay time" which is the time in which changes in the screw speed and the roller die speed affect the measured extrudate thickness and linear weight at location 3. Thus, there must be an "update" time before a new screw speed set point and a new roller die speed set point are computed, and the update time must be longer than the delay time.

Since the measured parameters, designated "meas", are subject to random, and possibly high frequency, systematic variations, these variables are averaged over some time period to diminish the influence of very short term fluctuations on controller action. Preferably, a running average of the measured values is obtained over a time period which is no longer than the difference between the update time and the delay time.

For measurements at location 3, the delay time in which changes in extruder operations affect the measured values is relatively long, since it takes the extrudate 16 a relatively long time to reach location 3 from the roller die 14. The update time at which the process control unit 21 provides updated set point values of screw speed and roller die speed from the location 3 measurements will also be relatively large, since this update time must be longer than the delay time. In order to obtain a shorter update time, variations may be made in the process control already described. For example, the thickness of the extrudate at location 2, $H_2^{meas}$, can be used to control screw speed with only a short update time. The thickness set point for location 2, $H_2^{set}$, and the roller die speed set point, $\Omega_d^{set}$, can be determined by measurements made at location 3 using part of the long update loop. The concept of process control using a combination of long and short update times is known in the art as "cascade control."

Using one such example of a short update loop, the time-averaged value of $H_2^{meas}$ can be used to calculate an adjusted set point value of this thickness as follows:

$$H_2^{set} = \overline{H}_2^{meas} \left( \frac{H_3^{set}}{\overline{H}_3^{meas}} \right) \left( \frac{\overline{\Omega}_d^{meas}}{\Omega_d^{set}} \right)^{\frac{1}{2}} \quad (3)$$

Using this value of $H_2^{set}$, a short update time loop value of the set point for the screw speed can be calculated as follows:

$$\Omega_s^{'set} = \left( \frac{H_2^{set}}{\overline{H}_2^{meas}} \right) \overline{\Omega}_s^{'meas} \quad (4)$$

The rotational speed of the die $\Omega_d$ is held constant during this short update time loop.

The update time for the long loop defined by equations (1) and (2) above may be about three minutes, while the update time for the short loop which uses equations (3) and (4) may be about 20 seconds.

The short update loop represented by equations (3) and (4) is one example of a relationship that may be used in a cascade control. Many other relationships are possible. For example, the pressure in the region behind the roller die can be measured, and this pressure measurement can be used in a manner similar to the extrudate thickness at the roller die to control screw speed with short update times.

A suitable program may be used in the process control unit 20 to provide the time-averaged values used in equations (1)-(4), and to perform the calculation of the equations as necessary to provide the new set point values for the rotational speed of the screw and the roller die.

An example of extruder operations using the method of the present invention is shown in FIG. 2. FIG. 2(a) shows the measured rotational speed of the extruder screw $\Omega_s^{meas}$. FIG. 2(b) shows the measured rotational speed of the roller die $\Omega_d^{meas}$. FIG. (c) shows the measured thickness of the extrudate at location 3, $H_3^{meas}$, and FIG. 2(d) shows the measured linear weight at location 3, $Wt_3^{meas}$. At point A of the extrusion run, the input set point values of the weight and thickness were changed to produce a 10% increase in the thickness dimension and a 10% decrease in the linear weight. As a result of the changes in the set point values, the screw speed and the die speed (FIGS. 2(a) and 2(b)) immediately decreased at point A. The screw speed (FIG. 2(a)) decreased to achieve a lower linear weight in accordance with equation (2). To increase the extrudate thickness, the roller die speed (FIG. 2(b)) was decreased in accordance with equation (1). Thereafter, the thickness (FIG. (c)) remained below the new set point level, and the linear weight (FIG. 2(d)) was slightly below the new set point level, so the roller die speed (FIG. 2(b)) was decreased while the screw speed (FIG. 2(a)) was increased. Ultimately, the screw speed (FIG. 2(a)) increased to near its initial value to compensate for the lower output per screw revolution caused by the increased head pressure resulting from lower roller die speed. After adjustments, the extrudate thickness (FIG. 2(c)) maintained a steady value 10% above the previous set point value, and the extrudate linear weight (FIG. 2(d)) maintained a steady value 10% below the previous value.

In the example of FIG. 2, only the long-term update loop using equations (1) and (2) were used. The addition of the short update loop, such as with equations (3) and (4) or when using measured pressure at the roller, would result in a faster response. In addition, other theoretical models, which more realistically set forth the relationship between the variables, would allow more rapid attainment of the new dimensional set points.

In this embodiment of the present invention, a cold-feed extruder was used, and the output of the extruder was varied by varying the speed of the extruder screw 11 to control extrudate size. In hot-feed extruders, the feed rate of the rubber into the extruder from the breakdown mill can be varied instead of the screw speed in order to vary the output of the extruder. The feed rate is varied by varying the width of the feed strips. In both cold and hot-feed extruders, it is also possible to use the speed of the take-away device 17 as a variable instead of screw speed or feed rate and to use equations representing the relationship of take-away speed to linear weight and thickness. The general concept of the invention is to use the roller die speed to control extrudate shape by increasing or decreasing extrudate thickness, while maintaining extrudate width substantially constant. The extrudate size, as represented by linear weight, can then be controlled by varying either the extruder output rate through the screw speed or the feed rate, or the take-away speed.

Other modifications and variations in the specific method herein shown and described will be apparent to those skilled in the art, all within the intended scope and spirit of the invention. While the invention has been shown and described with respect to a specific embodiment, this is intended for the purposes of illustration rather than limitation. Accordingly, the patent is not to be limited in scope and effect to the specific embodiment herein shown and described, nor in any other way that is inconsistent with the extent to which progress in the art has been advanced by the invention.

I claim:

1. A method of producing an extrudate from an extruder having means to vary output, a roller die having a plate die and a rotating roller, and a take away device which comprises the steps of:
   operating the extruder at an initial output rate, rotating the roller at an initial speed, and operating the take-away device at an initial speed to produce an extrudate having initial dimensions of size and shape,
   measuring said initial dimensions of the extrudate,
   comparing said measured initial dimension values of the extrudate with the desired dimension values of size and shape for the extrudate and
   controlling the size dimension of the extrudate by increasing or decreasing the linear weight of the extrudate by means of an increase or decrease in the extruder output rate of the extrudate relative to the take-away speed of the extrudate and controlling the shape of the extrudate by increasing or decreasing the extrudate thickness while the extrudate width is held substantially constant by decreasing or increasing the roller die speed.

2. A method of producing an extrudate as defined in claim 1, wherein the extruder has a rotating screw, and the extruder output rate is varied by varying the speed of the screw.

3. A method of producing an extrudate as defined in claim 1, wherein the extruder output rate is varied by varying the feed rate to the extruder.

4. A method of producing an extrudate as defined in claim 1, wherein the size dimension is changed by varying the extruder output rate or the take away device.

5. A method of producing an extrudate as defined in claim 1, wherein said increase or decrease in said output rate relative to said take away speed and wherein said increase or decrease in said roller die speed are made sequentially.

6. A method of producing an extrudate as defined in claim 1, wherein said increase or decrease in said output rate relative to said take away speed and wherein said increase or decrease in said roller die speed are made simultaneously.

* * * * *